United States Patent
Narusawa

(10) Patent No.: US 7,295,835 B2
(45) Date of Patent: Nov. 13, 2007

(54) WIRELESS TELEPHONE DEVICE AND COMPUTER READABLE MEDIUM STORING PROGRAM FOR CONTROLLING THE SAME

(75) Inventor: Hideki Narusawa, Tokyo (JP)

(73) Assignee: NEC Corporation, Tokyo (JP)

( * ) Notice: Subject to any disclaimer, the term of this patent is extended or adjusted under 35 U.S.C. 154(b) by 768 days.

(21) Appl. No.: 10/050,133

(22) Filed: Jan. 18, 2002

(65) Prior Publication Data

US 2002/0132615 A1    Sep. 19, 2002

(30) Foreign Application Priority Data

Jan. 18, 2001    (JP)    ............... 2001-010208

(51) Int. Cl.
*H04M 3/42*    (2006.01)
(52) U.S. Cl. ............ 455/415; 340/7.52; 379/93.17; 455/66.1; 455/551
(58) Field of Classification Search ............ 379/93.17, 379/93.23, 388, 390; 455/564, 550, 410, 455/411, 66.1, 437, 550.1, 551, 415; 340/7.52
See application file for complete search history.

(56) References Cited

U.S. PATENT DOCUMENTS

| | | | |
|---|---|---|---|
| 5,239,679 A * | 8/1993 | Murai | 340/7.52 |
| 5,905,958 A * | 5/1999 | Houde | 455/437 |
| 6,084,951 A * | 7/2000 | Smith et al. | 379/93.17 |
| 6,463,276 B1 * | 10/2002 | Jonsson | 455/410 |
| 6,463,297 B1 * | 10/2002 | Lee et al. | 455/550.1 |
| 6,771,954 B1 * | 8/2004 | Yoneyama et al. | 455/420 |
| 6,944,428 B2 * | 9/2005 | Hagiwara et al. | 455/66.1 |
| 2004/0038706 A1 * | 2/2004 | Wasser | 455/551 |

FOREIGN PATENT DOCUMENTS

| | | |
|---|---|---|
| JP | 4-86053 | 3/1992 |
| JP | 9-98211 | 4/1997 |

* cited by examiner

*Primary Examiner*—Gerald Gauthier
(74) *Attorney, Agent, or Firm*—Dickstein Shapiro LLP

(57) ABSTRACT

A wireless telephone device comprises: a unit for identifying a telephone number of a received call; a timer for measuring a time period from a time instant of receiving the call; a memory for storing a predetermined message and a predetermined time period both of which correspond to a predetermined telephone number and a display device is provided. The wireless telephone device displays the message on the display device when the wireless telephone device receives a call from the predetermined telephone number and then the call is cut off within the predetermined time period.

13 Claims, 3 Drawing Sheets

US 7,295,835 B2

WIRELESS TELEPHONE DEVICE AND COMPUTER READABLE MEDIUM STORING PROGRAM FOR CONTROLLING THE SAME

BACKGROUND OF THE INVENTION

This invention relates to wireless telephone devices such as cellular telephone terminals and PHS (personal handyphone system) terminals. In particular, this invention relates to wireless telephone devices that include a unit for detecting and identifying telephone numbers of callers (hereinafter referred to as caller number) and a unit for displaying characters and/or graphics such as a calendar and telephone numbers.

It is assumed that a message is to be sent to a user of a wireless telephone device. Since most of recent wireless telephone devices have two or more functions for sending/receiving a message, the user has to select one of the functions to send the message.

First, a certain subscriber, namely, a caller may speak with another user (called user or callee) on a usual telephone call and informs him/her of a voice message. In this case, the callee must be ready for not only catching a radio wave for receiving a call, but also answering the calling certain subscriber by voice.

Second, if the wireless telephone device includes an answering machine or its communication service provider that provides the corresponding service, the caller may record his/her message once in its answering machine or provider in order to convey the message to the callee later. In this case, the caller does not worry whether the callee is now ready for accepting the message or not. However, it is difficult to record a voice message clearly and entirely, and in consequence, the voice message recorded in an answering machine may be unreliable.

Third, the caller may send a text message such as an e-mail. Also in this case, the caller doesn't have to worry whether the callee is now ready for accepting the message or not. However, the caller has to input a message by the use of a keyboard or the like.

Furthermore, in all of the above-mentioned cases, in order to send a message to a subscriber of a wireless telephone device, the caller has to establish a connection between his/her terminal and the wireless telephone device or a mail server. At any rate, such a call should inevitably follow payment of a telephone bill whatever a message is short. Generally, a telephone bill for connection to wireless telephone devices is more expensive than that imposed on fixed subscriber stations.

SUMMARY OF THE INVENTION

It is an object of this invention to provide a wireless telephone device and a computer readable medium storing a computer program for controlling wireless telephone device.

According to one aspect of this invention, a wireless telephone device comprising: a unit for identifying a telephone number of a received call; a timer for measuring a time period from a time instant of receiving the call; a memory for storing a predetermined message and a predetermined time period both of which correspond to a predetermined telephone number and a display device is provided. The wireless telephone device displays the message on the display device when the wireless telephone device receives a call from the predetermined telephone number and then the call is cut off within the predetermined time period.

The wireless telephone device may further comprise a unit for prohibiting answering to a call received from the predetermined telephone number until the predetermined time has passed.

The memory may further store an additional message and an additional time period both of which correspond to the predetermined telephone number. In this case, the device further comprises a selector for selecting one of the messages according to the measured time period.

The memory may further store an additional telephone number different from the predetermined telephone number and at least one message and time period both of which correspond to the additional telephone number.

The wireless telephone device may further comprise a unit for prohibiting answering to a call received from the predetermined telephone number until the predetermined time period has passed.

The messages and the time periods may be set through an external device connected with the wireless telephone device.

The display device may be a color LCD (liquid crystal display).

According to another aspect of the present invention, a computer readable medium storing a computer program for controlling a wireless telephone device is provided. The computer program comprises the steps of. storing a predetermined message, a predetermined time period and a predetermined telephone number in a memory; identifying a call from the predetermined telephone number; measuring a time period from receiving the call to being cut off the call; displaying the predetermined message on a display device of the wireless telephone device when the measured time period agrees with the predetermined time period.

The computer program may further comprise the step of prohibiting answering to a call received from the predetermined telephone number until the predetermined time period has passed.

The storing step may store an additional messages and an additional time period both of which correspond to the predetermined telephone number. In this case, the computer program further comprises a selecting step for selecting one of the messages for displaying at the displaying step according to the measured time period.

The storing step may further store an additional telephone number different from the predetermined telephone number and at least one message and time period both of which correspond to the additional telephone number. In this case, the selecting step selects one of the messages stored in the memory according to the measured time period and the identified telephone number.

The computer program may further comprise the step of prohibiting answering to a call received from the predetermined telephone number until the predetermined time period has passed.

The predetermined messages and the predetermined time periods may be set through an external device connected with the wireless telephone device at the storing step.

DESCRIPTION OF THE PREFERRED EMBODIMENTS

Figure 1:
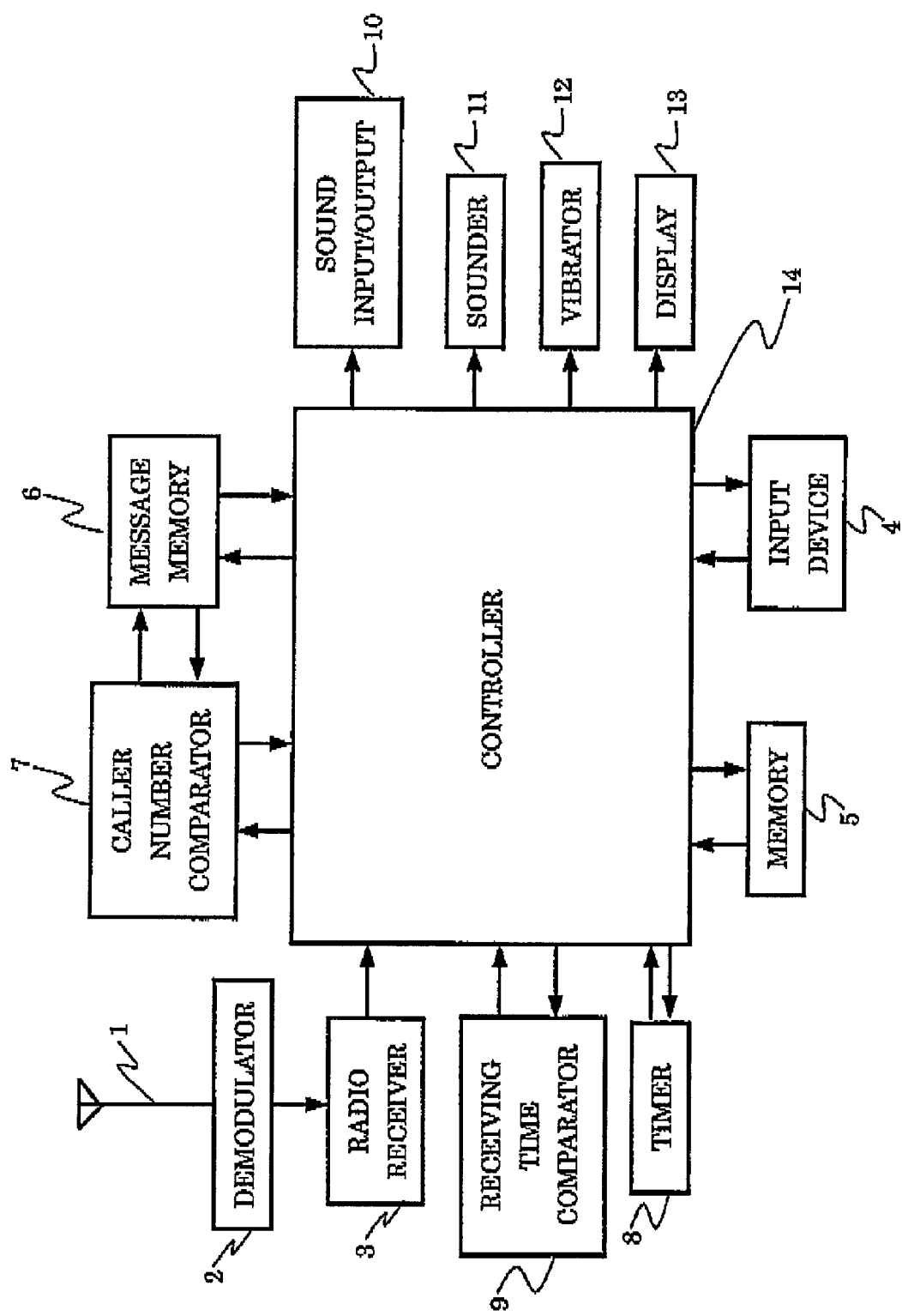
FIG. 1 shows a block diagram for use in describing a wireless telephone device of an embodiment of the present invention.

Referring to FIG. 1, description will be made about an embodiment of the present invention. In FIG. 1, the wireless telephone device of the embodiment includes an antenna 1, a radio receiver 2, a demodulator 3, an input device 4, a memory 5, a message memory 6, a caller number comparator 7, a timer 8, an receiving time comparator 9, a sound input/output 10, a sounder 11, a vibrator 12, a display 13 and a controller 14.

The radio receiver 2 receives radio waves conveying signals through the antenna 1 and converts the same into intermediate frequency (IF) waves. The demodulator 3 demodulates the IF waves into demodulated signals. The wireless telephone device can execute various kinds of operations when a user manipulates the input device 4. These operations include dialing, answering a call, cutting off the line, editing a telephone directory, retrieval of telephone number from the telephone directory, and editing/setting messages. To this end, the input device 4 includes a set of numeral keys and may further include auxiliary character keys, alphabet keys and/or function keys.

The memory 5 stores the data of the telephone directory and programs performed on the wireless telephone device. The message memory 6 stores relationship between telephone numbers that the user inputs with the input device 4, time periods and messages. Hereinafter the telephone numbers and time periods stored in the message memory 6 are referred to as registered numbers and registered time, respectively. When the wireless telephone device receives a call, the caller number comparator 7 compares its caller number with the registered numbers.

If the call number corresponds to one of the registered numbers, the controller 14 activates the timer 8 so as to measure a passage of time from a time instant at which the call is received. Hereinafter the passage of time is referred to as a receiving time. The receiving time comparator 9 compares the receiving time and registered times. The sounder 11 generates sound waves for ringing or beep sound. The vibrator 12 generates vibration for notifying the user of the reception of the call. The illustrated display 13 is assumed to be a color LCD (liquid crystal display) for displaying various information such as a caller number, the content of the telephone directory, date and time. The controller 14 controls the above-mentioned components 3-13.

The table 1 mentioned below is an example of the relationship stored in the message memory 6. In the table 1 # indicates a digit of number.

TABLE 1

| registered numbers | registered times | messages |
| --- | --- | --- |
| ###-####-###1 | 1-3 seconds | Call back home |
| ###-####-###1 | 3-5 seconds | Come back home |
| ###-####-###2 | 1-4 seconds | Come back to the office |
| ###-####-###3 | 1-3 seconds | Come back to your desk |

As shown in the table 1, the message memory 6 stores three registered numbers ###-####-###1, ###-####-###2 and ###-####-###3. In correspondence to the registered number ###-####-1 two registered times "1-3 seconds" and "3-5 seconds" are stored. These two registered times further correspond to the messages stored in the message memory 6 "Call back home" and "Come back home", respectively. Similarly, in correspondence to the registered number ###-####-###2, the registered time "1-4 seconds" and the message "Come back to the office" are stored in the message memory 6. In correspondence to the registered number ###-####-###3, the registered time "1-3 seconds" and the message "Come back to your desk" are stored in the message memory 6.

According to the wireless telephone device, first, the radio receiver 2 receives through the antenna 1 radio waves from base stations of a cellular telephone system or a fixed-side radio end-point connected to the public telecommunication network, and outputs the intermediate frequency wave to the demodulator 3. Next, the demodulator 3 demodulates signals, which include sound signals and control signals, in the intermediate frequency waves and outputs the signals to the controller 14. The controller 14 processes the sound signals so as to reduce noise, enhance human voice and so on and outputs to the sound input/output 10. Anyway, the controller 14 performs operations with reference to the control signals.

Figure 2:
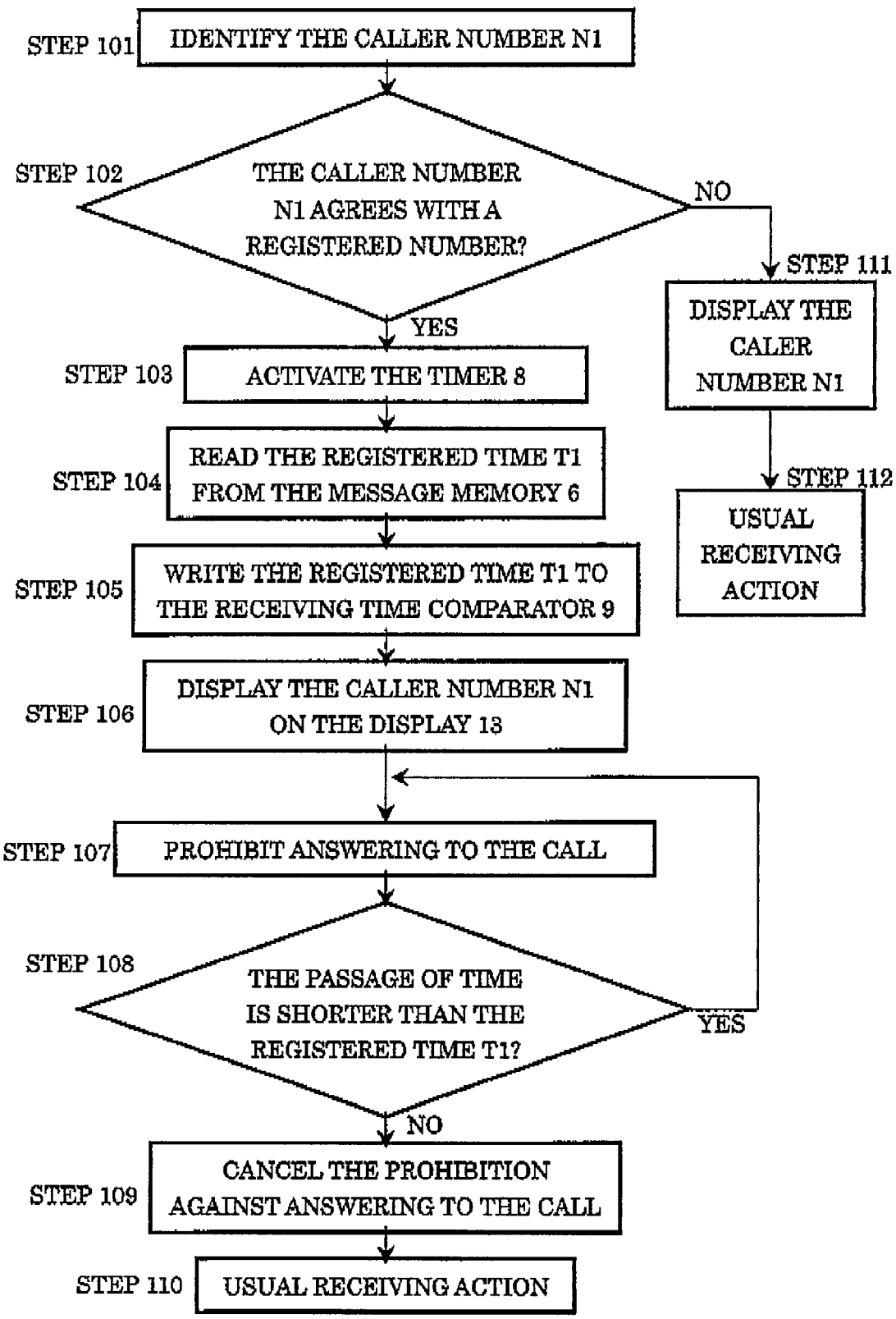
FIG. 2 shows a flowchart for use in describing a process for receiving a call of the wireless telephone device.
Figure 3:
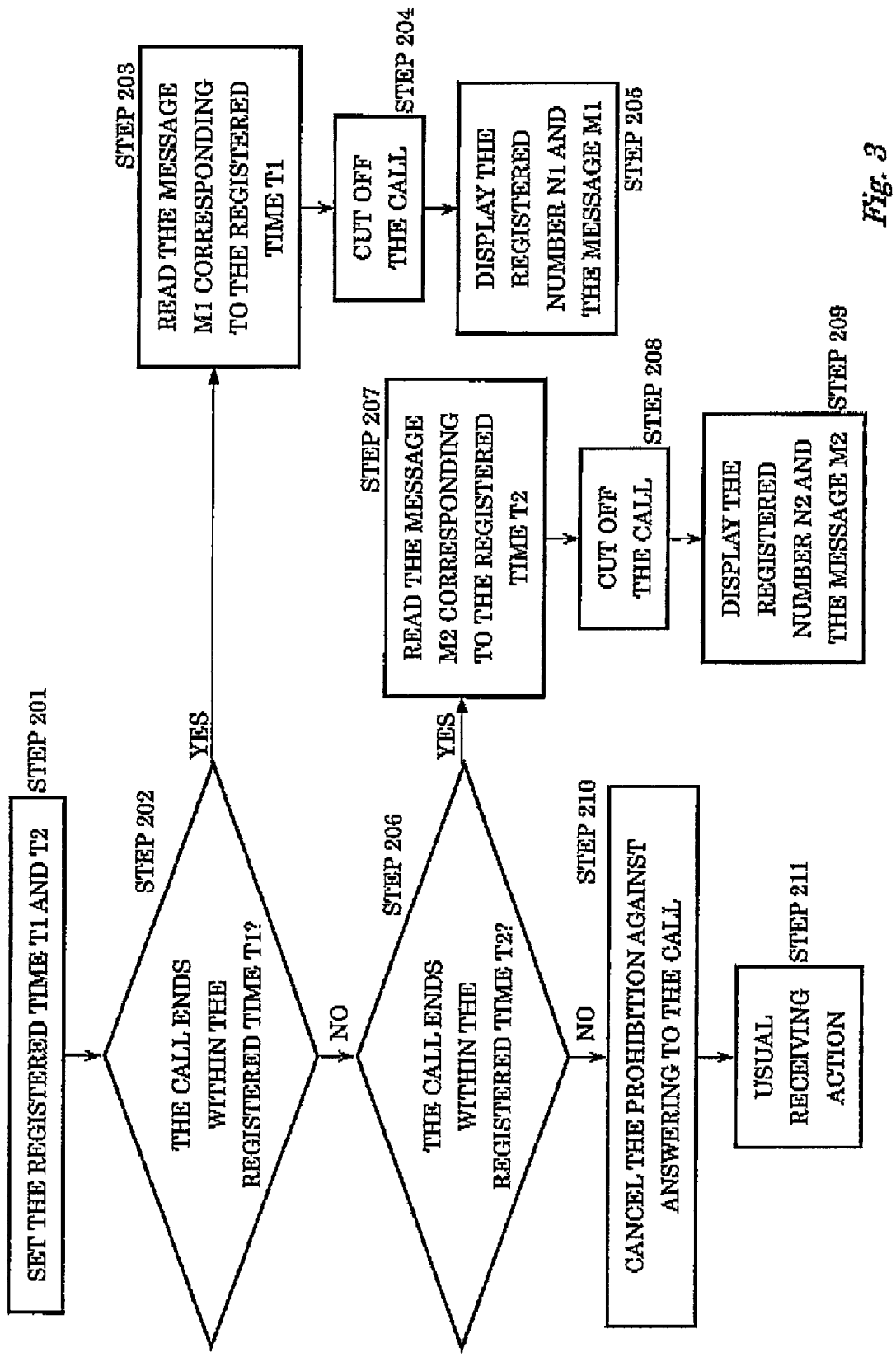
FIG. 3 shows a flowchart for use in describing a process for selecting a message of the wireless telephone device.

When the wireless telephone device receives a call from one of the registered numbers, the wireless telephone device prohibits answering to the call until the longest one of the registered time corresponding to the registered number has passed. This process is described below with reference to FIG. 2.

When the wireless telephone device receives a call from a telephone terminal whose telephone number N1 is noticed together with arrival of the call (STEP 101), the caller number comparator 7 compares the caller number N1 with each of registered numbers stored in the message memory 6 (STEP 102).

If the caller number N1 agrees with one of the registered numbers, the controller 14 activates the timer 8 (STEP 103), reads the registered time T1 corresponding to the caller number N1 from the message memory 6 (STEP 104), and writes the registered time T1 into the receiving time comparator 9 (STEP 105). The controller 14 displays the caller number N1 on the display 13 (STEP 106), activates the sounder 11 so as to notify the user to receive the call, and prohibits answering to the call (STEP 107).

The receiving time comparator 9 compares the registered time T1 with the time clocked by the timer 8 (STEP 108). While answering to the call is prohibited, the controller 14 ignores the operation even if the user operates the input device 4 so as to answer a call. If the time clocked by the timer 8 becomes larger than the registered time T1, the prohibition against answering to the call is canceled (STEP 109). After that, the wireless telephone device answers the call if the user operates the input device 4 so as to answer the call (STEP 110).

At STEP 102, if none of the registered numbers agrees with the caller number N1, the controller 14 displays the caller number N1 on the display 13 (STEP 111) and, in response to the user's operation, the wireless telephone device answers the call (STEP 112).

Next, description will be made about how to select one of messages related with one registered number. It is assumed that the message memory 6 stores relationship between a registered number N1 and two registered times T1 and T2 (T1<T2), and the registered times T1 and T2 are made to correspond to messages M1 and M2, respectively.

The controller 14 sets the registered times T1 and T2 to the receiving time comparator 9 (STEP 201). The receiving time comparator 9 compares the registered time T1 with current time output from the timer 8 (STEP 202).

If the call ends during the registered time T1, the controller 14 reads the message M1 corresponding to the registered time T1 from the message memory 6 (STEP 203), finishes processes for receiving the call (STEP 204), and displays the registered number N1 and the message M1 on the display 13 (STEP 205).

If the call is held over the registered time T1, the receiving time comparator 9 compares the registered time T2 with current time output from the timer 8 (STEP 206).

If the call ends during the registered time T2, the controller 14 reads the message M2 corresponding to the registered time T2 from the message memory 6 (STEP 207), finishes processes for receiving the call (STEP 208), and displays the registered number N1 and the message M2 on the display 13 (STEP 209).

If the call is held over the registered time T2 at STEP 206, the controller 14 cancels prohibition against answering the call (STEP 210) and becomes ready for answering the call in response to the user's operation input from the input device 4 (STEP 211).

While this invention has thus far been described in conjunction with a few embodiments thereof, it will be readily possible for those skilled in the art to put the this invention into various other manners.

For example, in the above-mentioned embodiment, the relationship between registered numbers, registered times and messages is stored in the message memory 6. However, the relationship may be stored in any memory device that the controller 14, the caller number comparator 7 and the receiving time comparator 9 can access.

In the above-mentioned embodiment, the user sets the relationship with the input device 4. However, if the wireless telephone device further includes an interface for connecting the wireless telephone device to an external device such as a personal computer, the relationship may be set with the external device.

In the above-mentioned embodiment, the message memory 6 stores three registered numbers and corresponding registered times and messages. However, more registered numbers and corresponding registered times and messages may be reasonably stored in the message memory 6 or an applicable device.

In the above-mentioned embodiment, the controller 14 prohibits answering to a call from one of the registered numbers until the registered time has passed. However, the controller 14 may allow answering the call without the prohibition.

In the abovementioned embodiment, the wireless telephone device includes the caller number comparator 7, the receiving time comparator 9 and the controller 14 as independent components of the wireless telephone device. Instead of this, the wireless telephone device may include a memory device for storing the programs of executing the processes corresponding to the caller number comparator 7, the receiving time comparator 9 and the controller 14, and a processing unit for performing the programs. For example, a flexible disk device, CDROM device, MO disc device and DVD-ROM device are available for the memory device for storing the programs.

In addition to the relationship mentioned above, the caller's name corresponding to the registered numbers may further be stored in the wireless telephone device in order that the wireless telephone device displays the caller's name on the display 13 simultaneously with displaying the registered number.

In the above-mentioned embodiment, the wireless telephone device includes the sounder 11 and vibrator 12 for notifying the user to receive a call. However, the wireless telephone device may include other components for notifying the user to receive the call.

What is claimed is:

1. A wireless telephone device comprising:
   means for identifying a telephone number of a received call;
   a timer for measuring a time period from a time instant of receiving the call;
   a memory for storing a predetermined message and a predetermined time period both of which correspond to a predetermined telephone number; and
   a display device;
   wherein the wireless telephone device displays the predetermined message on the display device when the wireless telephone device receives a call from the predetermined telephone number and then the call is cut off within the predetermined time period.

2. The wireless telephone device claimed in claim 1, further comprising means for prohibiting answering to a call received from the predetermined telephone number until the predetermined time period has passed.

3. The wireless telephone device claimed in claim 1, wherein:
   said memory further stores an additional message and an additional time period both of which correspond to the predetermined telephone number;
   the device further comprises a selector for selecting one of said messages according to the measured time period.

4. The wireless telephone device claimed in claim 3, wherein said memory further stores an additional telephone number different for the predetermined telephone number and at least one message and time period both of which correspond to said additional telephone number.

5. The wireless telephone device claimed in claim 3, further comprising means for prohibiting answering to a call received from the predetermined telephone number until the predetermined time period has passed.

6. The wireless telephone device claimed in claim 3, wherein said messages and said time periods are set through an external device connected with the wireless telephone device.

7. The wireless telephone device claimed in claim 1, wherein said display device is a color LCD (liquid crystal display).

8. A computer readable medium storing a computer program for controlling a wireless telephone device, said computer program operable to cause the wireless telephone device to:
   store a predetermined message, a predetermined time period and a predetermined telephone number in a memory;
   identify a call from the predetermined telephone number;
   measure a time period from receiving the call to cutting off the call; and
   display the predetermined message on a display device of the wireless telephone device when the measured time period agrees with the predetermined time period.

9. The computer readable medium claimed in claim 8, wherein said computer program further comprises prohibiting answering to a call received from the predetermined telephone number until the predetermined time period has passed.

10. The computer readable medium claimed in claim 8, wherein:

said storing step stores an additional messages and an additional time period both of which correspond to the predetermined telephone number;

said computer program further comprises a selecting step for selecting one of said messages for displaying at said displaying step according to the measured time period.

11. The computer readable medium claimed in claim 10, wherein:

said storing step further stores an additional telephone number different from the predetermined telephone number and at least one message and time period both of which correspond to said additional telephone number; and said selecting step selects one of the messages stored in said memory according to the measured time period and the identified telephone number.

12. The computer readable medium claimed in claim 10, wherein said computer program further comprises prohibiting answering to a call received from the predetermined telephone number until the predetermined time period has passed.

13. The computer readable medium claimed in claim 10, wherein the predetermined messages and the predetermined time periods are set through an external device connected with the wireless telephone device at said storing step.

* * * * *